United States Patent
Thole et al.

(10) Patent No.: US 11,390,331 B2
(45) Date of Patent: Jul. 19, 2022

(54) RECONFIGURABLE PICKUP BED SIDES AND ENDGATE

(71) Applicant: GM GLOBAL TECHNOLOGY OPERATIONS LLC, Detroit, MI (US)

(72) Inventors: Louis D. Thole, Grosse Pointe Park, MI (US); Karan Moorjani, Oak Park, MI (US); Paul W. Alexander, Ypsilanti, MI (US); Wonhee M. Kim, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/083,691

(22) Filed: Oct. 29, 2020

(65) Prior Publication Data
US 2022/0135146 A1   May 5, 2022

(51) Int. Cl.
*B62D 33/027* (2006.01)

(52) U.S. Cl.
CPC ................ *B62D 33/0276* (2013.01)

(58) Field of Classification Search
CPC ............. B62D 33/023; B62D 33/0276; B62D 33/037; B62D 33/027; B60P 3/341; B60P 7/065
USPC .................... 296/26.01, 26.04, 143
See application file for complete search history.

(56) References Cited

U.S. PATENT DOCUMENTS

| | | | | |
|---|---|---|---|---|
| 2,764,950 A * | 10/1956 | Finnell | ................ | B61D 5/002 410/119 |
| 3,065,019 A * | 11/1962 | May | ................ | B60P 3/341 296/173 |
| 3,338,619 A * | 8/1967 | Bartels | ................ | B60P 7/14 296/24.44 |
| 9,821,862 B2 | 11/2017 | Han et al. | | |
| 10,512,150 B2 | 12/2019 | Dadheech et al. | | |
| 10,687,634 B1 | 6/2020 | Kim et al. | | |
| 10,912,182 B2 | 2/2021 | Han et al. | | |
| 11,014,619 B2 | 5/2021 | Han et al. | | |
| 11,034,221 B2 | 6/2021 | Yen et al. | | |
| 11,125,253 B2 | 9/2021 | Alexander et al. | | |
| 2002/0167186 A1* | 11/2002 | Morse | ................ | B60R 9/00 296/26.02 |
| 2011/0158834 A1* | 6/2011 | Pan | ................ | F04D 25/084 417/423.14 |
| 2011/0225731 A1* | 9/2011 | Hanrahan | ................ | A47C 17/80 5/118 |
| 2015/0125233 A1* | 5/2015 | Wilson | ................ | B60P 7/135 410/119 |
| 2017/0159312 A1* | 6/2017 | Zwack, III | ................ | E04H 6/42 |
| 2019/0316613 A1 | 10/2019 | Khalighi et al. | | |
| 2020/0198711 A1 | 6/2020 | Han et al. | | |
| 2020/0391811 A1 | 12/2020 | Han et al. | | |
| 2021/0114507 A1 | 4/2021 | Alexander et al. | | |
| 2021/0170837 A1* | 6/2021 | Alexander | ................ | B60J 1/2075 |
| 2021/0245817 A1* | 8/2021 | Gibbs | ................ | B62D 33/037 |

* cited by examiner

*Primary Examiner* — Jason S Morrow
*Assistant Examiner* — Wenwei Zhuo (57) ABSTRACT

A pick-up truck cargo area includes a cargo floor having a forward end, a rearward end and a pair of side edges extending between the forward end and the rearward end. A pair of inflatable bedside panels extend along the pair of side edges. A pair of bed side rails extend above the cargo floor and support the pair of inflatable bedside panels.

20 Claims, 14 Drawing Sheets

RECONFIGURABLE PICKUP BED SIDES AND ENDGATE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a pickup trucks and more particularly to reconfigurable bed sides and end gate for a pickup bed.

SUMMARY

A pick-up truck cargo area includes a cargo floor having a forward end, a rearward end and a pair of side edges extending between the forward end and the rearward end. A pair of inflatable bedside panels extend along the pair of side edges. A pair of bed side rails extend above the cargo floor and support the pair of inflatable bedside panels. The pair of inflatable bedside panels are retractable into a hollow chamber of the pair of bed side rails. A pair of end gate rails extending from ends of the pair of bed side rails. An inflatable end gate panel is retractable into a hollow chamber of the pair of end gate rails. The pair of end gate rails are connected to the pair of bed side rails by a pneumatic hinge. An inflatable end gate extends along the rearward end of the cargo floor.

The pair of inflatable bedside panels are reversibly attached to one of the cargo floor and a pair of bed side rails extending above the cargo floor by at least one of a latch or a zipper.

The pair of inflatable bedside panels are reversibly attached to one of the cargo floor and a pair of bed side rails extending above the cargo floor by a magnetic element. An electromagnetic element associated with the magnetic element can be energized to release the inflatable bedside panels from the magnetic element.

The pair of inflatable bedside panels are received against at least one sidewall extending from one of the cargo floor and a pair of bed side rails extending above the cargo floor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
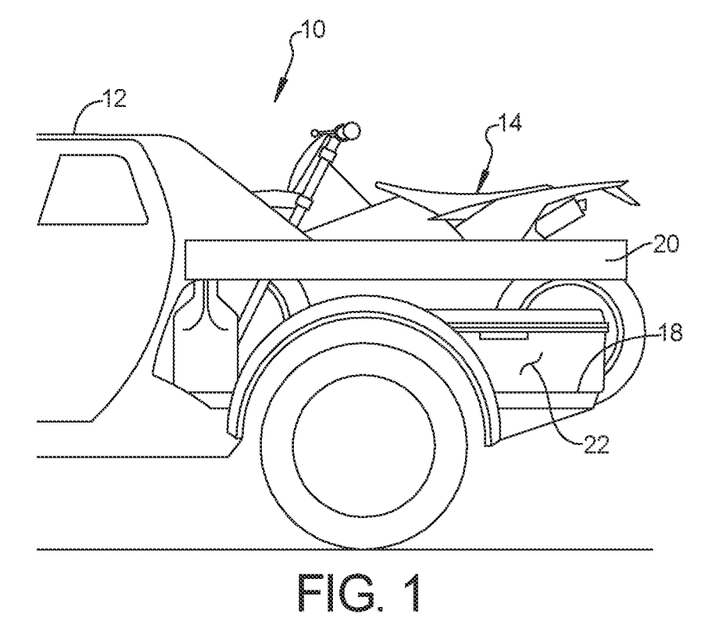
FIG. 1 is a side plan view of a vehicle truck bed having reconfigurable bed sides and tailgate with the bed sides and tailgate retracted according to the principles of the present disclosure.
Figure 2:
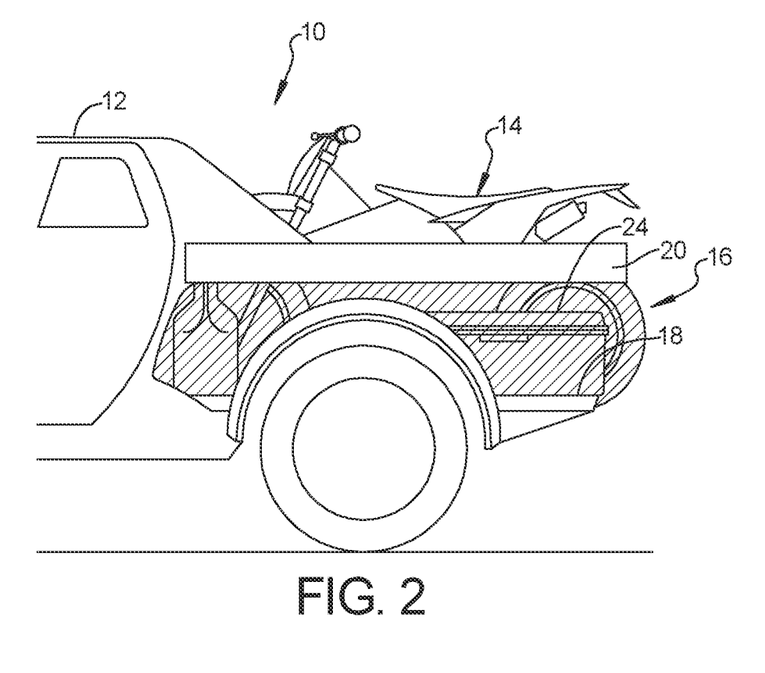
FIG. 2 is a side plan view of a vehicle truck bed having reconfigurable bed sides and tailgate with the bed sides and tailgate extended according to the principles of the present disclosure.
Figure 3:
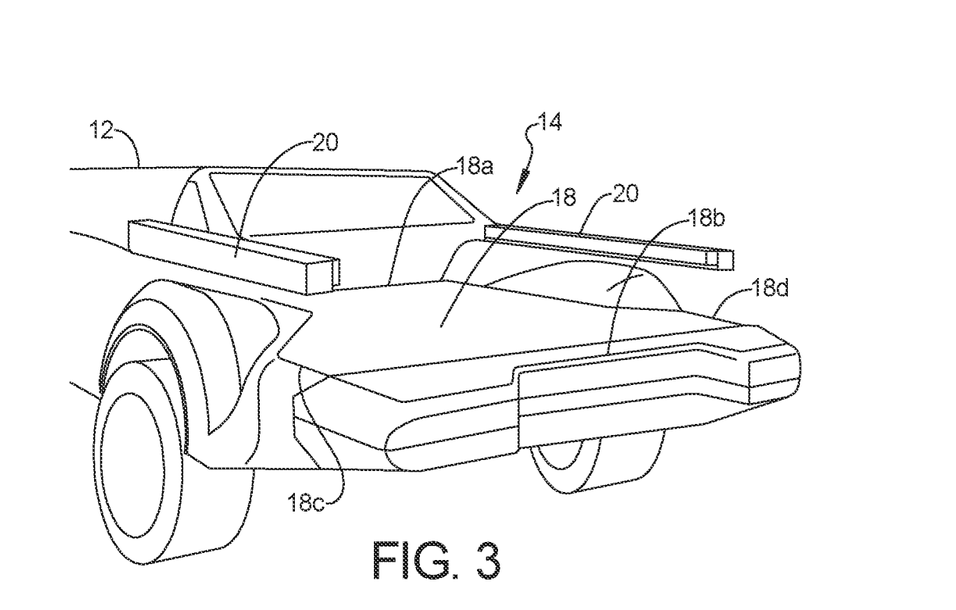
FIG. 3 is a perspective view of a vehicle truck bed having reconfigurable bed sides and tailgate with the bed sides and tailgate retracted according to the principles of the present disclosure.

With reference to FIGS. 1-3 a pickup truck 10 is shown having a passenger compartment 12 and a cargo area 14 with a reconfigurable sidewall and end gate system 16. The cargo area 14 includes a cargo floor 18 having a forward end 18*a*, a rearward end 18*b* and a pair of side edges 18*c-d* extending between the forward end 18*a* and the rearward end 18*b*, as best shown in FIG. 3. A pair of bed side rails 20 extend from the passenger compartment 12 and above the side edges 18*c-d* of the cargo floor 18. As shown in FIG. 1 an opening 22 is provided between the side rail 20 and the cargo floor 18. The opening 22 allows easy access for loading or unloading items into the cargo area from the sides of the pickup truck cargo area 14.

With reference to FIG. 2, an inflatable bedside panel 24 can be supported by and extend downward from the bed side rail 20. The bedside panel 24 can also engage the cargo floor 18 in order to close off the cargo area 14. It should also be understood that the bed side panels 24 can be supported on the cargo floor 18 and inflate in an upward direction to engage the bed side rails 20.

Figure 4:
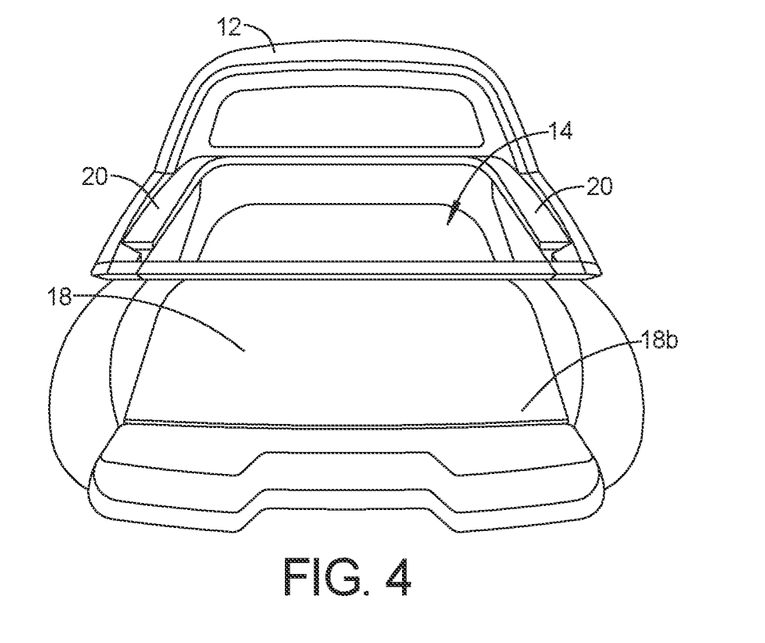
FIG. 4 is a rear perspective view of a vehicle truck bed having reconfigurable bed sides and tailgate with the tailgate rails in a closed position according to the principles of the present disclosure.
Figure 5:
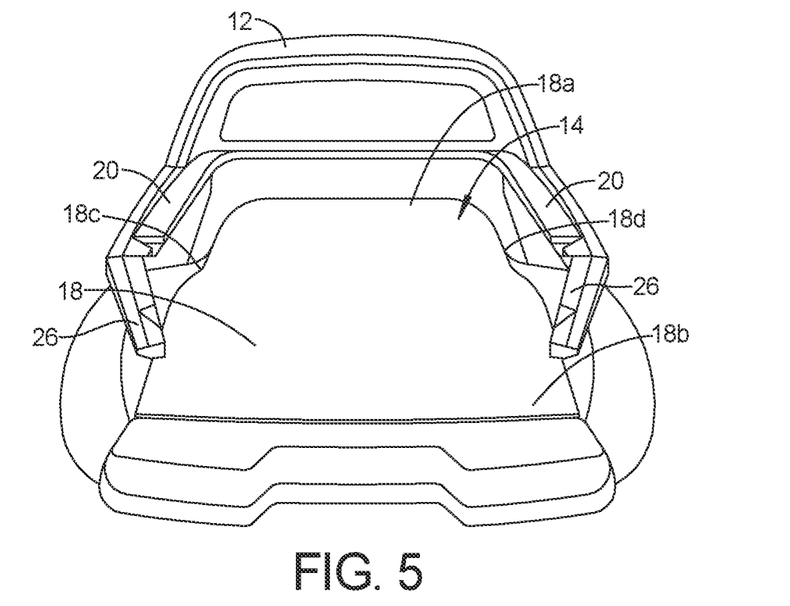
FIG. 5 is a rear perspective view of a vehicle truck bed having reconfigurable bed sides and tailgate with the tailgate rails in an open position according to the principles of the present disclosure.
Figure 6:
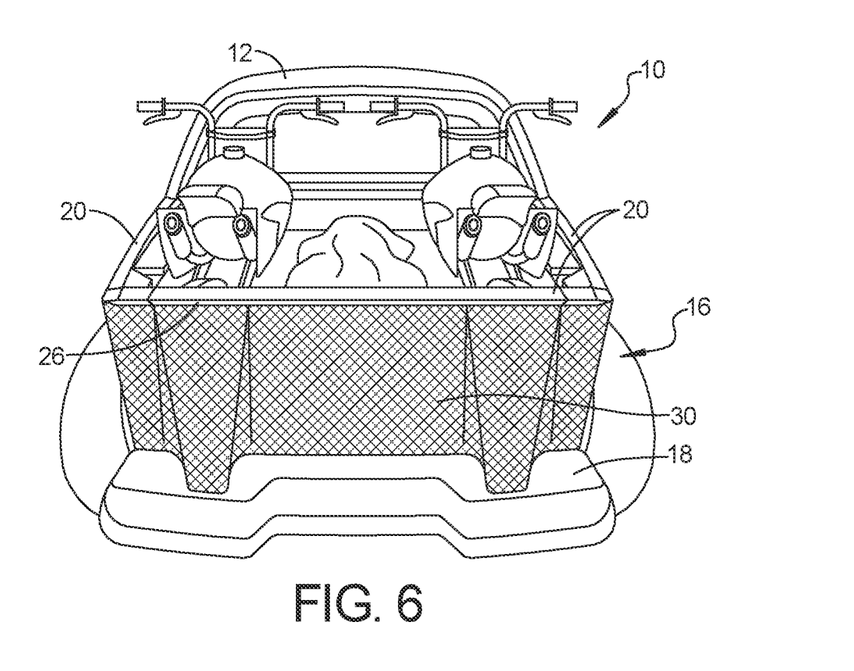
FIG. 6 is a rear perspective view of a vehicle truck bed having reconfigurable bed sides and tailgate with the bed sides and tailgate extended according to the principles of the present disclosure.

With reference to FIGS. 4 and 5, a pair of end gate rails 26 each extend from a respective one of the bed side rails 20 and are moved from a closed position as shown in FIG. 4 to an open position as shown in FIG. 5. The pair of end gate rails 26 are pivotally connected to the bed side rails by a hinge joint 28. As shown in FIG. 6, an inflatable end gate panel 30 can be supported by and extend below each of the end gate rails 26 and engage the cargo floor 18 in order to close off the cargo area 14. It should also be understood that the end gate panels 30 can be supported on the cargo floor 18 and inflate in an upward direction to engage the end gate rails 26. The inflatable end gate panel 30 is capable of conforming to a shape of objects O (such as motorcycle tires) disposed in the cargo area 14 and extending over the rearward end 18*b* of the cargo floor 18.

Figure 7:
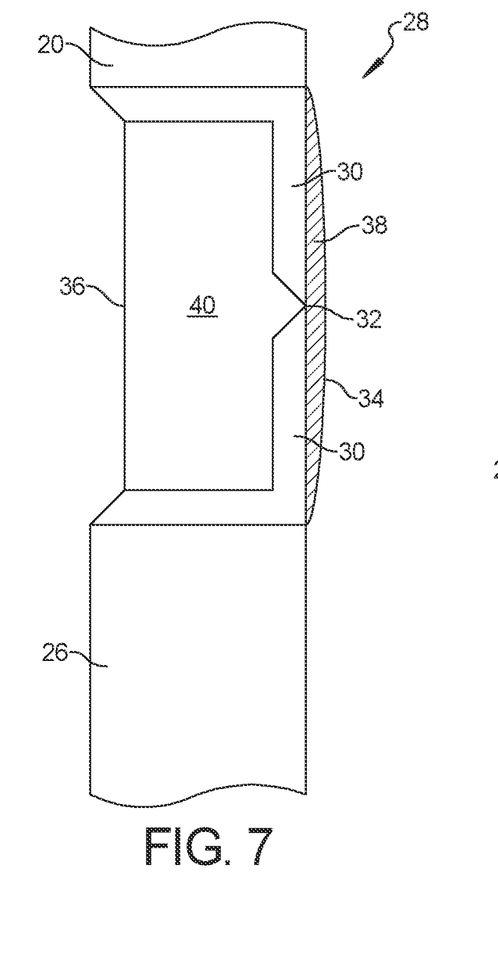
FIG. 7 is a schematic view of a hinge joint for the tailgate rails shown in an extended position.
Figure 8:
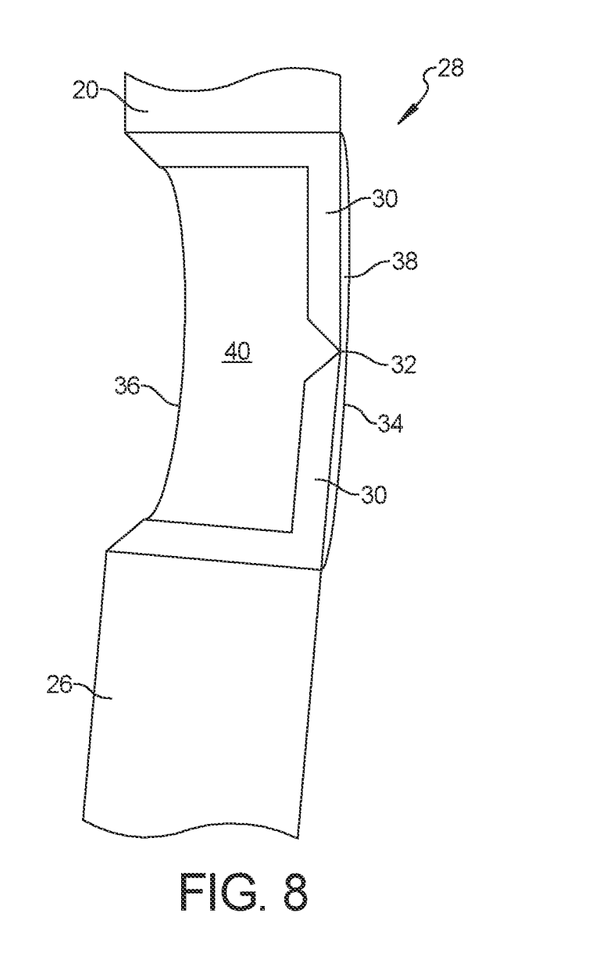
FIG. 8 is a schematic view of a hinge joint for the tailgate rails shown in a closed position.
Figure 9:
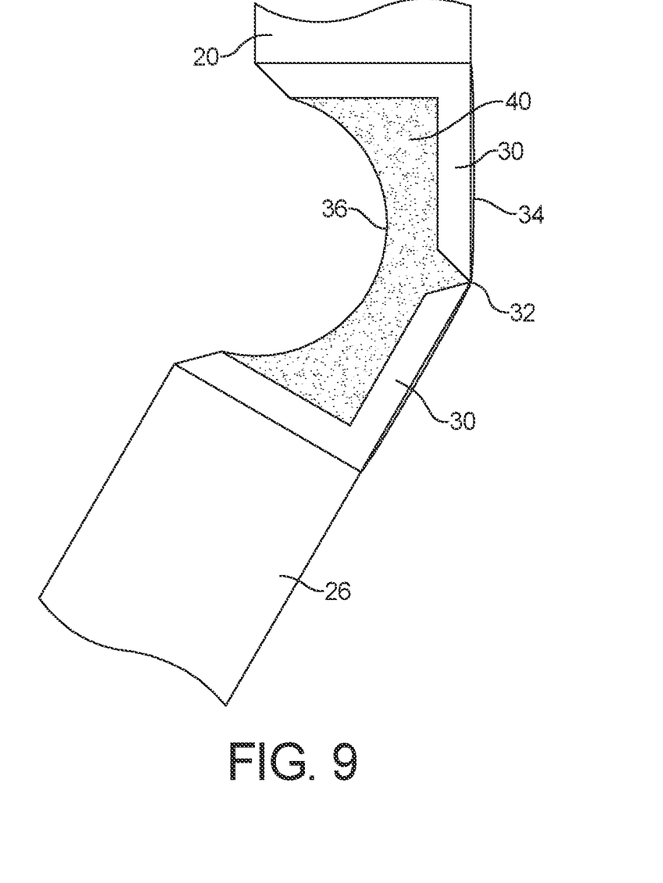
FIG. 9 is a schematic view of a hinge joint for the tailgate rails shown being moved to a closed position.
Figure 10:
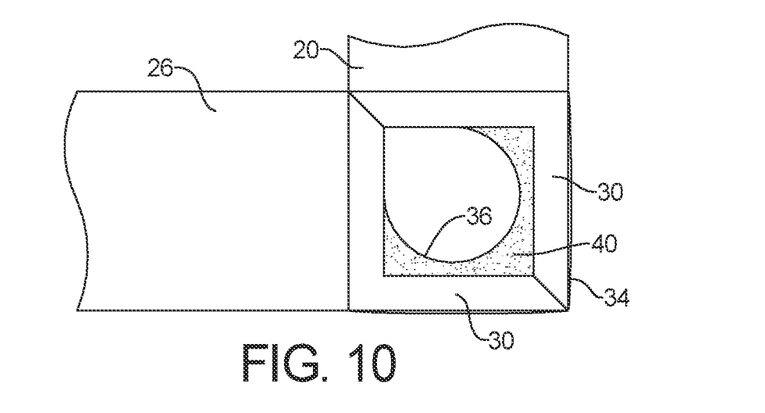
FIG. 10 is a schematic view of a hinge joint for the tailgate rails shown in a closed position.

With reference to FIGS. 7-10, the hinge joint 28 is shown connecting the end gate rail 26 to the bed side rail 20. The hinge joint 28 includes a pair of hinge sections 30 that are pivotally connected to one another at a hinge point 32 of any known construction such as but not limited to a hinge pin or a flex joint. The hinge joint 28 can be a pneumatic hinge. The pneumatic hinge joint 28 further includes an extensor bladder 34 and an abductor bladder 36. When a positive pressure is applied to an extensor cavity 38 enclosed by the extensor bladder 34, the hinge joint 28 is extended to an open position as shown in FIG. 7. When a negative pressure is applied to an abductor cavity 40 enclosed by the abductor bladder 36, the hinge joint 28 is pivoted toward a closed position as shown in FIGS. 9 and 10. The end gate rails 26 can be latched closed so that the vacuum pressure is not required to hold the end gate rails 26 in the closed position.

Figure 11:
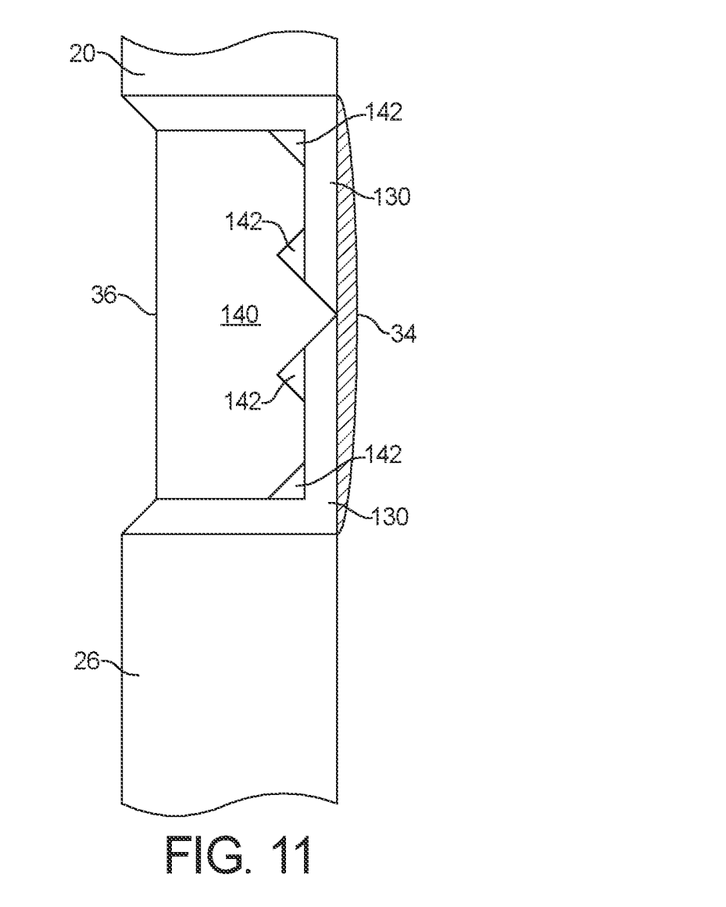
FIG. 11 is a schematic view of an alternative hinge joint for the tailgate rails shown in an extended position.
Figure 12:
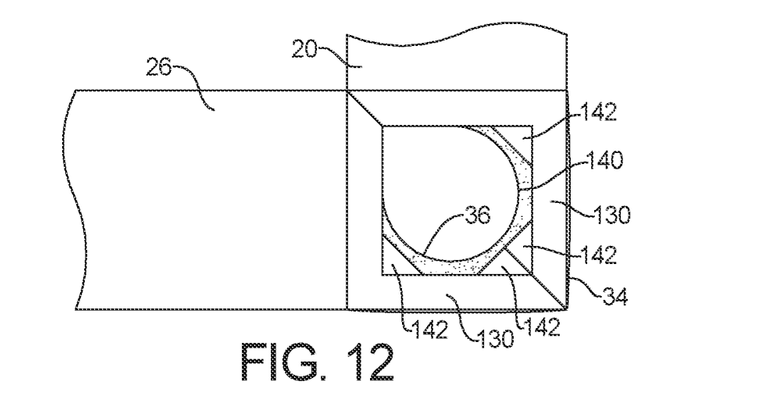
FIG. 12 is a schematic view of the alternative hinge joint for the tailgate rails shown in a closed position.

With reference to FIGS. 11-12, the pair of hinge sections 130 can be modified to include additional protrusions 142 on the inner walls of the abductor cavity 140 in order to fill and match the shape of the abductor bladder 136, reducing the total volume of air that must be vacuumed out and speeding actuation.

Figure 13:
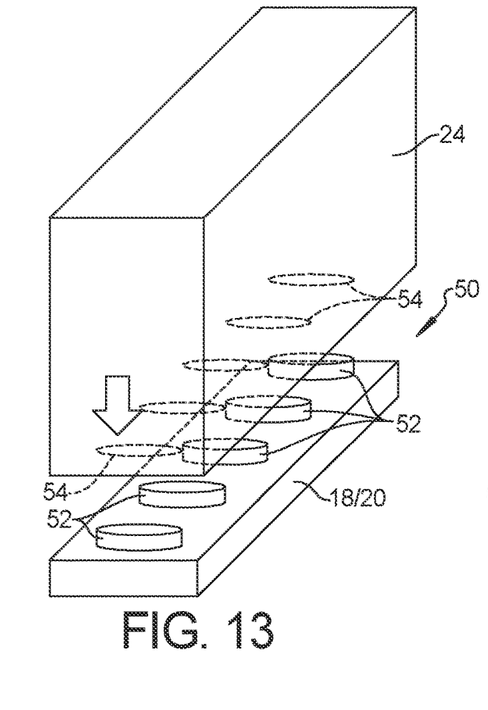
FIG. 13 is a schematic view of a retention system for engaging the sidewall panels and end gate to the cargo floor using electromagnets shown in a disengaged state.
Figure 14:
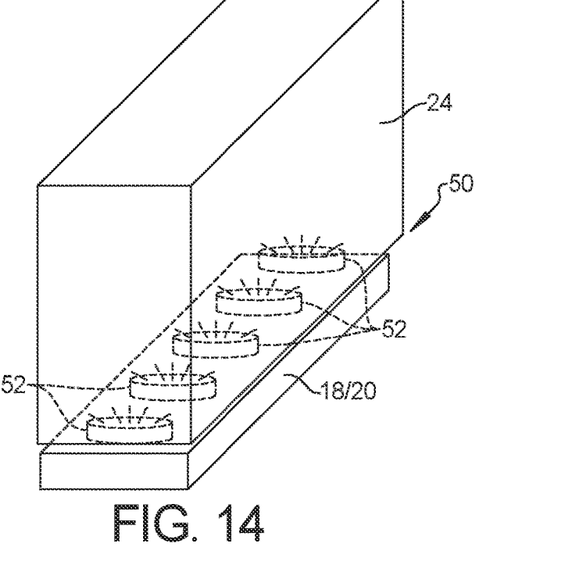
FIG. 14 is a schematic view of a retention system for engaging the sidewall panels and end gate to the cargo floor using electromagnets shown in an engaged state.

With reference to FIGS. 13-14, the inflatable bed side panel 24 is shown including an electromagnetic retention system 50 including a plurality of electromagnets 52 in the cargo floor 18 that are energized, as shown in FIG. 14, to latch with metallic or magnetic elements 54 incorporated into the lower edge of the inflatable bed side panels 24.

Figure 15:
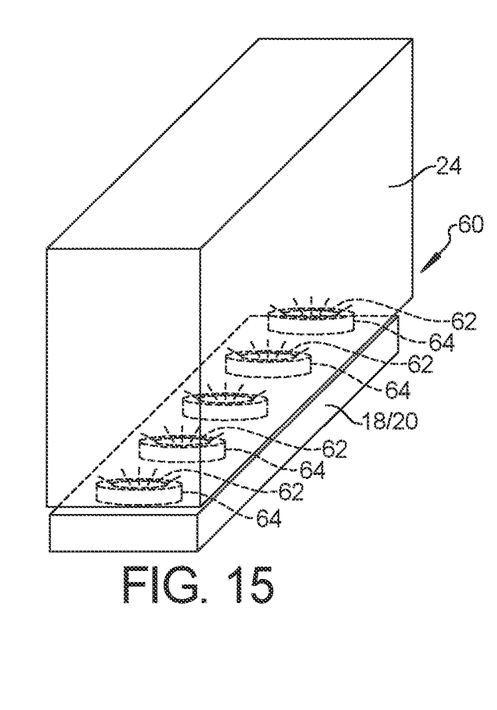
FIG. 15 is a schematic view of an alternative retention system for engaging the sidewall panels and end gate to the cargo floor using electromagnets shown in an engaged state.
Figure 16:
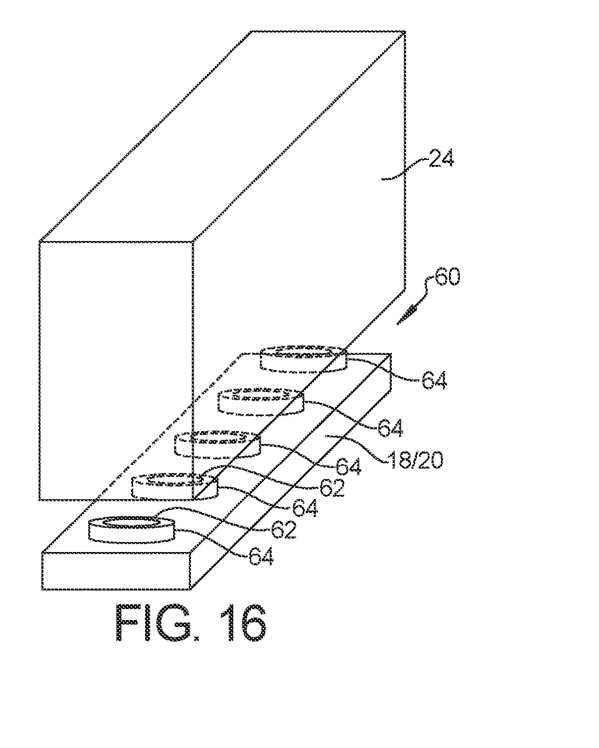
FIG. 16 is a schematic view of the alternative retention system for engaging the sidewall panels and end gate to the cargo floor using electromagnets shown in a disengaged state.

As an alternative, as shown in FIGS. 15-16, the inflatable bed side panel 24 is shown including an electromagnetic retention system 60 including a plurality of permanent magnets 62 are used to latch the inflatable bed side panels 24 to the cargo floor 18 and electromagnets 64 that are concentric to the permanent magnets 62 are energized in order to release the bed side panels 24 from the cargo floor 18 so that the bed side panels can be retracted, as shown in FIG. 16.

Figure 17:
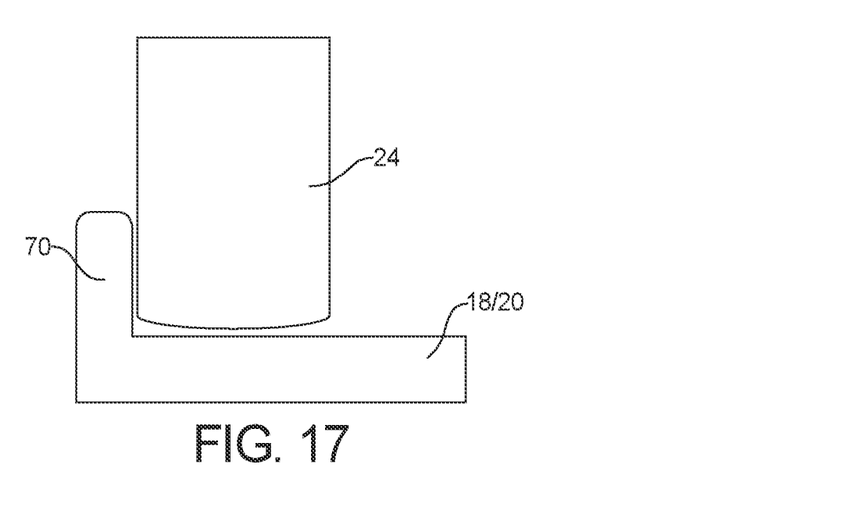
FIG. 17 is a schematic view of a block-type retention system for securing the sidewall panels and end gate relative to the cargo floor.

According to another alternative as shown in FIG. 17, the inflatable bed side panels 24 can be deployed against a mechanical interference wall feature 70 on the cargo floor. The wall feature 70 can be disposed on the outboard side of the inflatable bed side panel 24 and optionally also on the inboard side to constrain the sidewalls from lateral motion in both the inboard and outboard directions.

Figure 18:
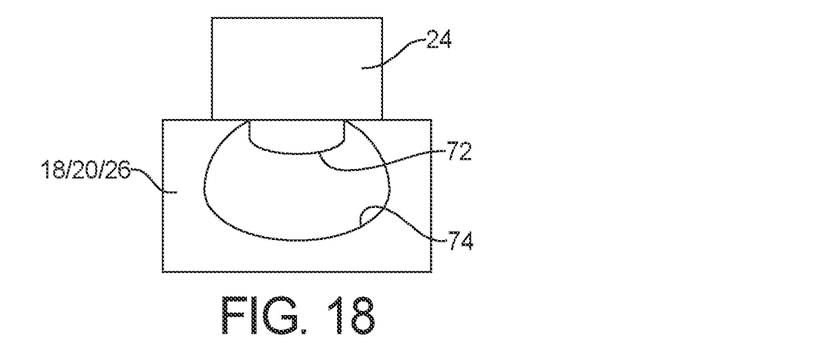
FIG. 18 is a schematic view of an inflatable retention system for engaging the sidewall panels and end gate to the cargo floor shown in a disengaged state.
Figure 19:
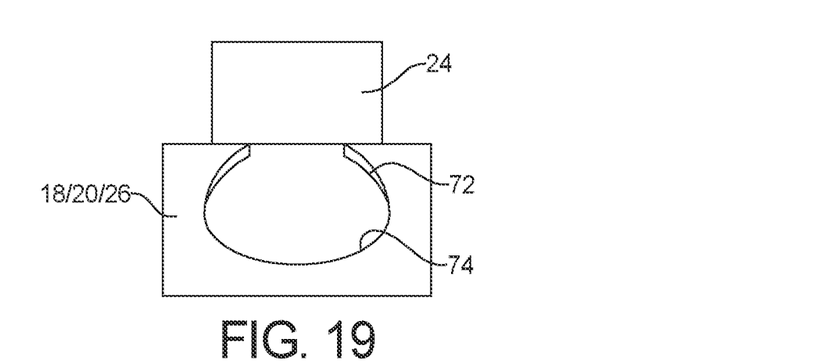
FIG. 19 is a schematic view of an inflatable retention system for engaging the sidewall panels and end gate to the cargo floor shown in an engaged state.

According to a still further alternative embodiment as shown in FIGS. 18-19, a secondary inflatable bladder 72 can be used for engagement with a channel feature 74 that can be disposed in the cargo floor 18 or the bed side rails 20 or end gate rails 26. Once the bed side panels 24 or the end gate panels 30 are inflated, the secondary inflatable bladder 72 can be inflated to expand into the channel feature 74 in order to provide an interference lock with either of the cargo floor 18 or the bed side rails 20 or end gate rails 26.

It should also be understood that the free ends of the bed side panels 24 and the end gate panels 30 can be engaged with either the cargo floor 18 or the bed side rails 20 or the end gate rails 26 by other means such as zippers, hook and loop fastener (e.g. VELCRO), latches, and grommets.

Figure 20:
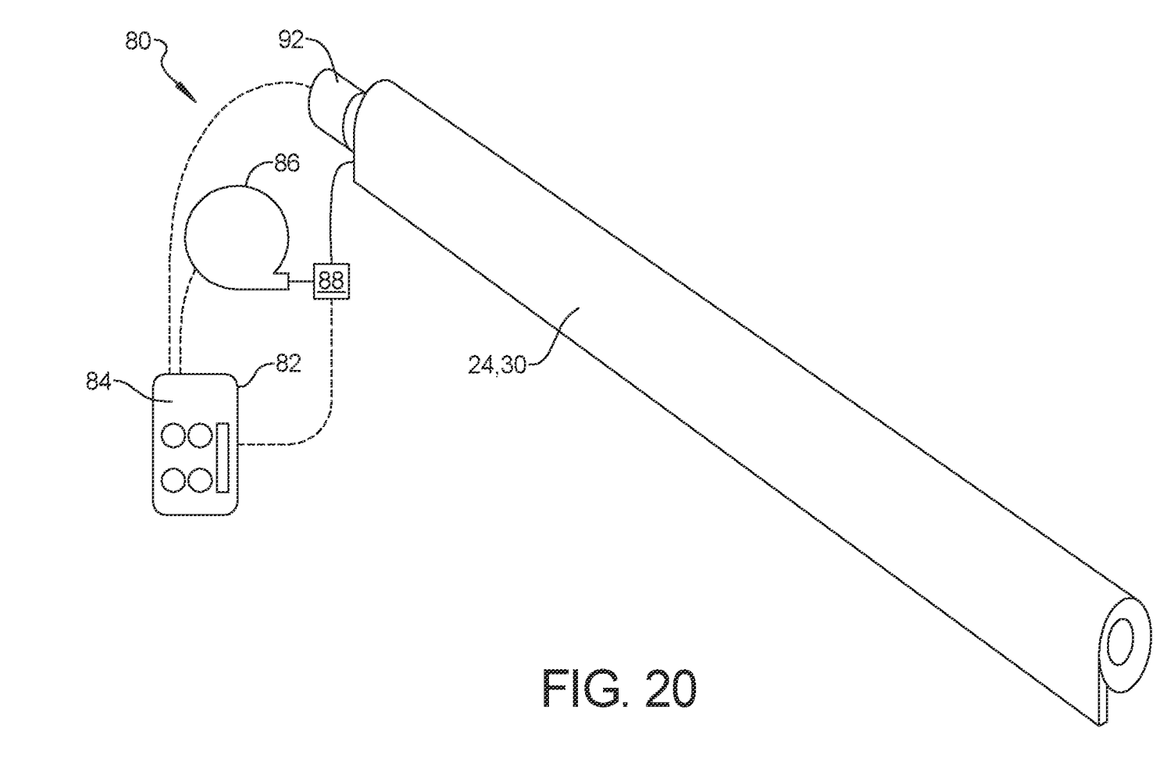
FIG. 20 is a schematic diagram of an exemplary control system for controlling deployment and retraction of the side wall panels.
Figure 21:
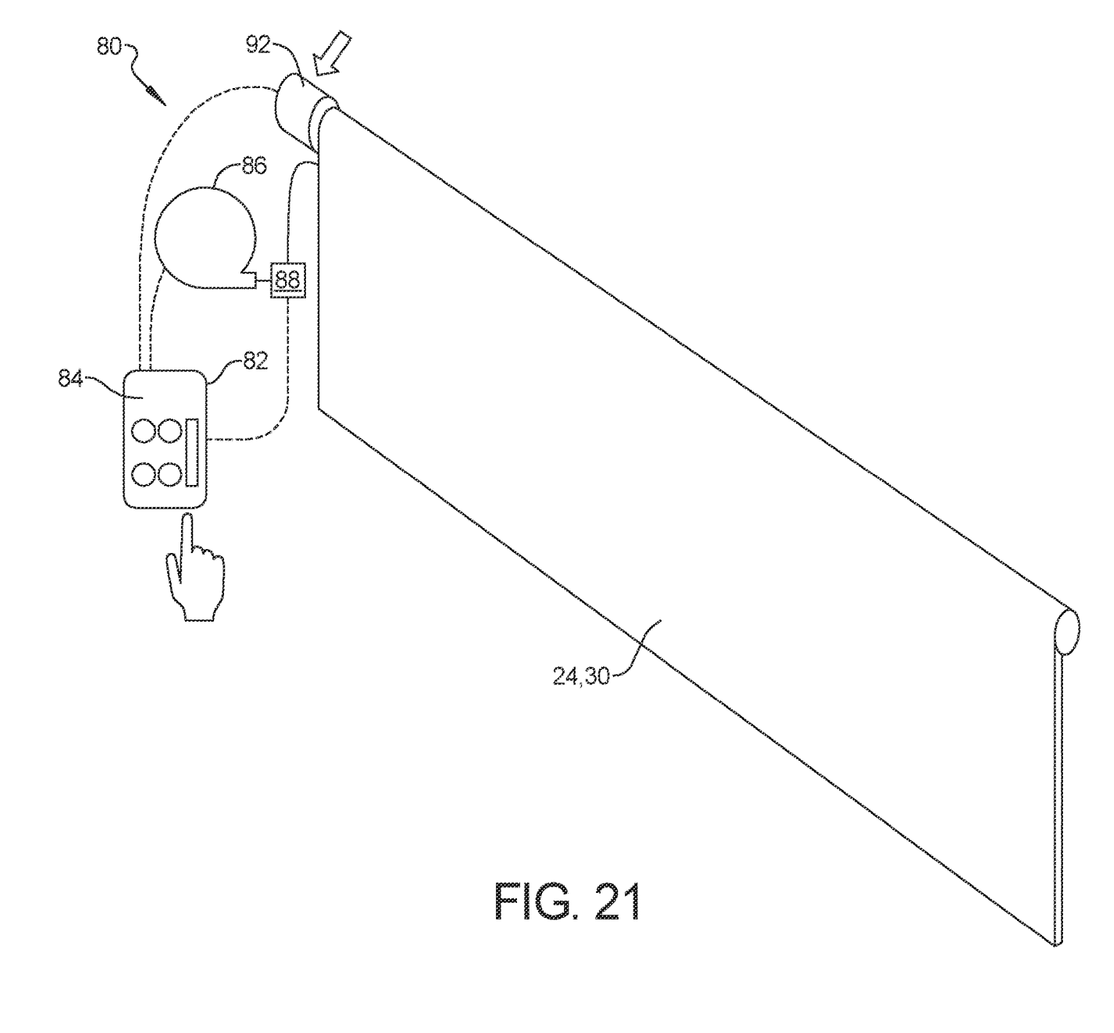
FIG. 21 is a schematic diagram of the exemplary control system showing the motor deploying the side wall panel.
Figure 22:
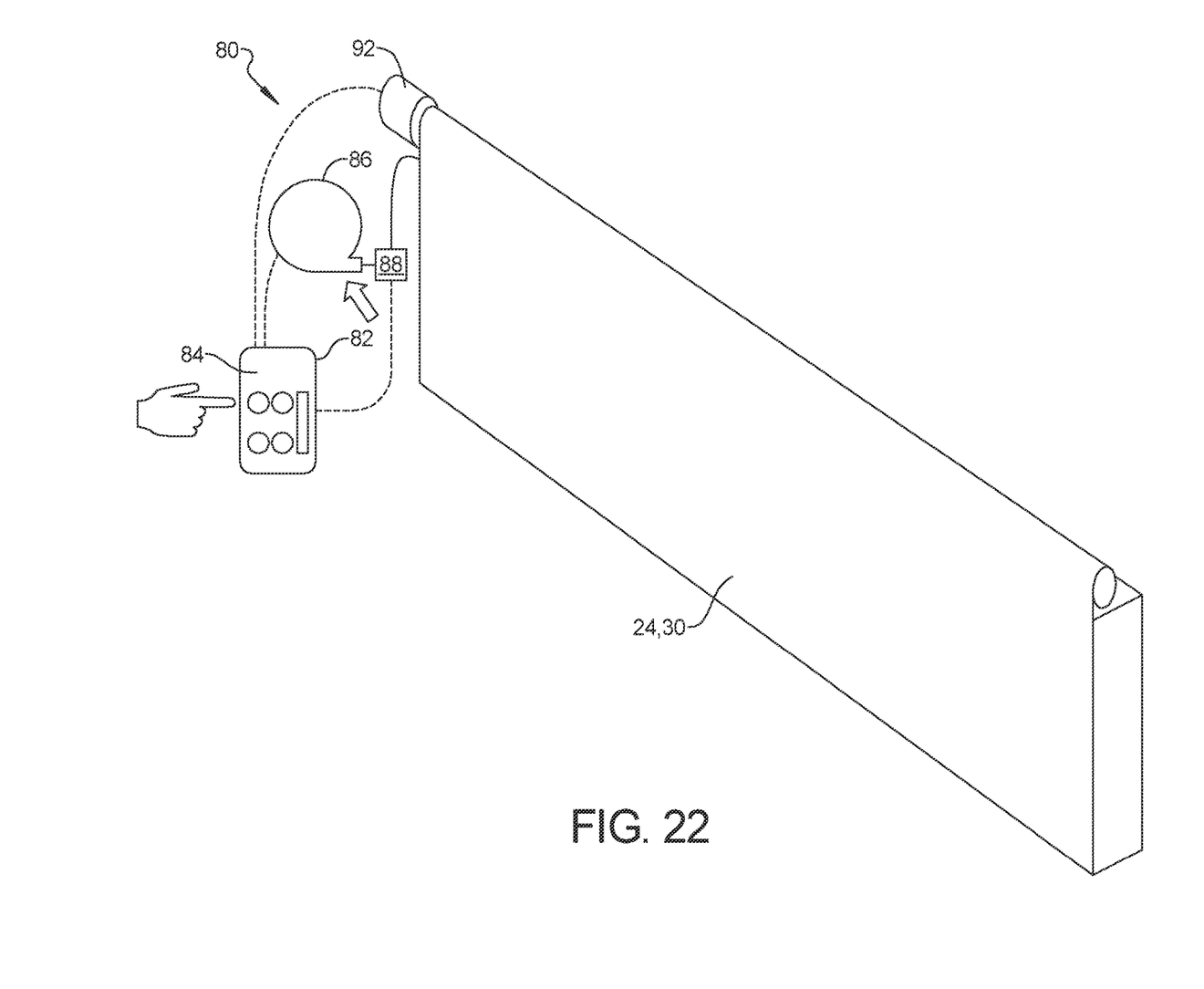
FIG. 22 is a schematic diagram of the exemplary control system showing the pump inflating the side wall panel.

With reference to FIGS. 20-22, an exemplary diagram is provided of the control system 80 for controlling the deployment and retraction of the bed side panels 24 and the end gate panels 30. As shown in FIG. 20, a controller 82 is provided in communication with a user interface 84 which can be activated to deploy or retract the bed side panels 24 and the end gate panels 30. The user interface 84 can include a wired or wireless interface that receives user inputs to "deploy" or "retract" the bed side panels 24 and the end gate panels 30. The "deploy" signals from the user interface can cause the controller 82 to provide signals to activate a compressor or pump 86 and an appropriate valve bank 88 to supply pressurized air to the bed side panels 24 and end gate panels 30, as shown in FIG. 22. The "retract" signal from the user interface 84 can cause the controller 82 to open the appropriate valve of a valve bank 88 to release the pressurized air within the bed side panels and the end gate panels and/or activate the pump 86 and valve bank 88 to apply a vacuum to the panels for quicker retraction. The "deploy" and "retract" signals may also cause the controller to provide signals to an optional motorized roller 92 that can roll out the bed side panels 24 and end gate panels 30 prior to or simultaneously with inflation or roll in the bed side panels 24 and end gate panels 30 simultaneously with or after deflation, as illustrated in FIG. 21. The controller 82 can also provide "lock" and "unlock" signals to the optional electromagnetic retention system 50, inflatable retention system 60 or another alternative controllable retention system. The controller 82, the pump 86 and the valve bank 88 can also be utilized to operate the pneumatic hinge joints 28 by applying pressurized air or vacuum to the extensor cavity 38 or the abductor cavity 40 as described herein.

Figure 23:
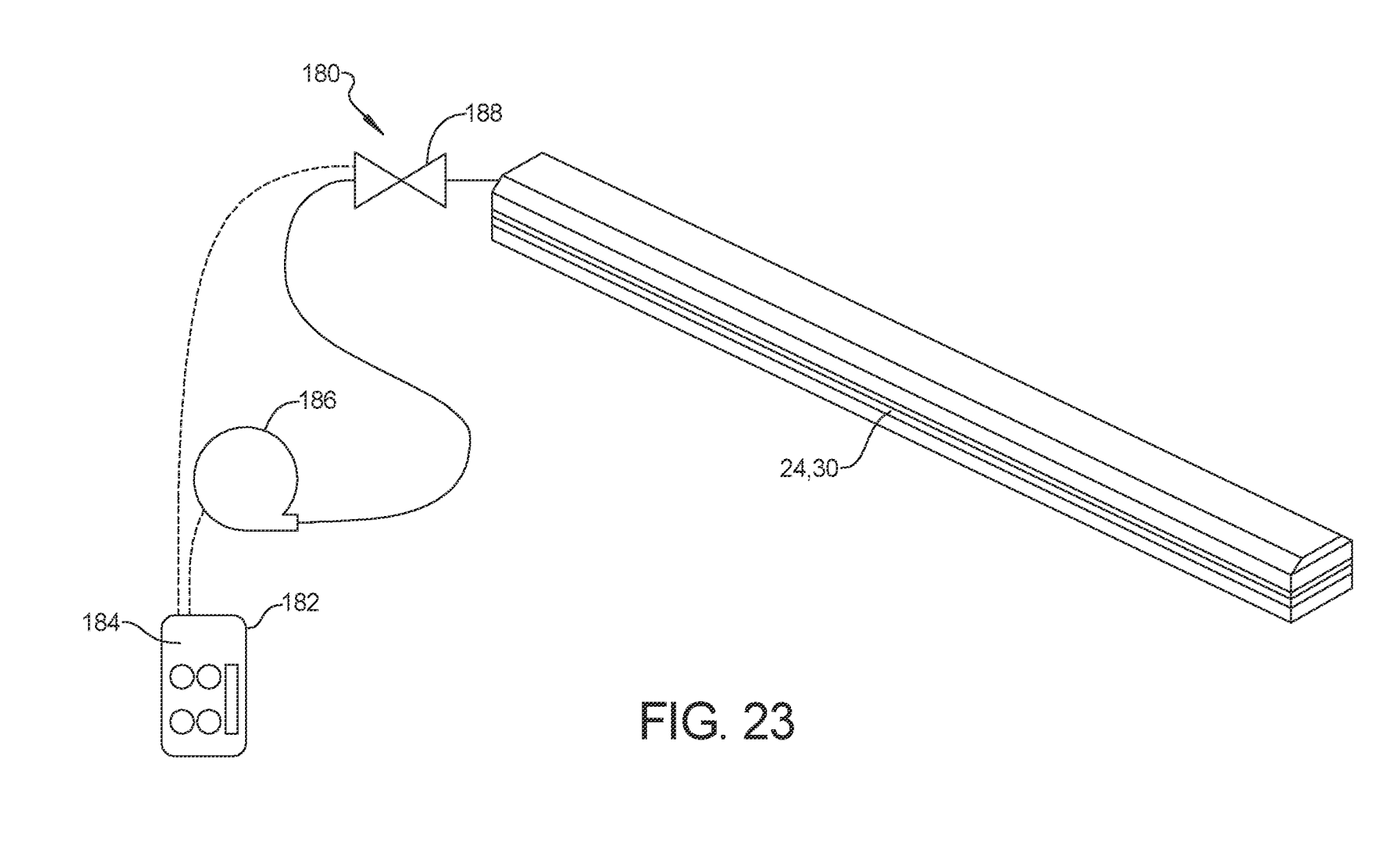
FIG. 23 is a schematic diagram of a second exemplary control system for controlling deployment and retraction of the side wall panels.
Figure 24:
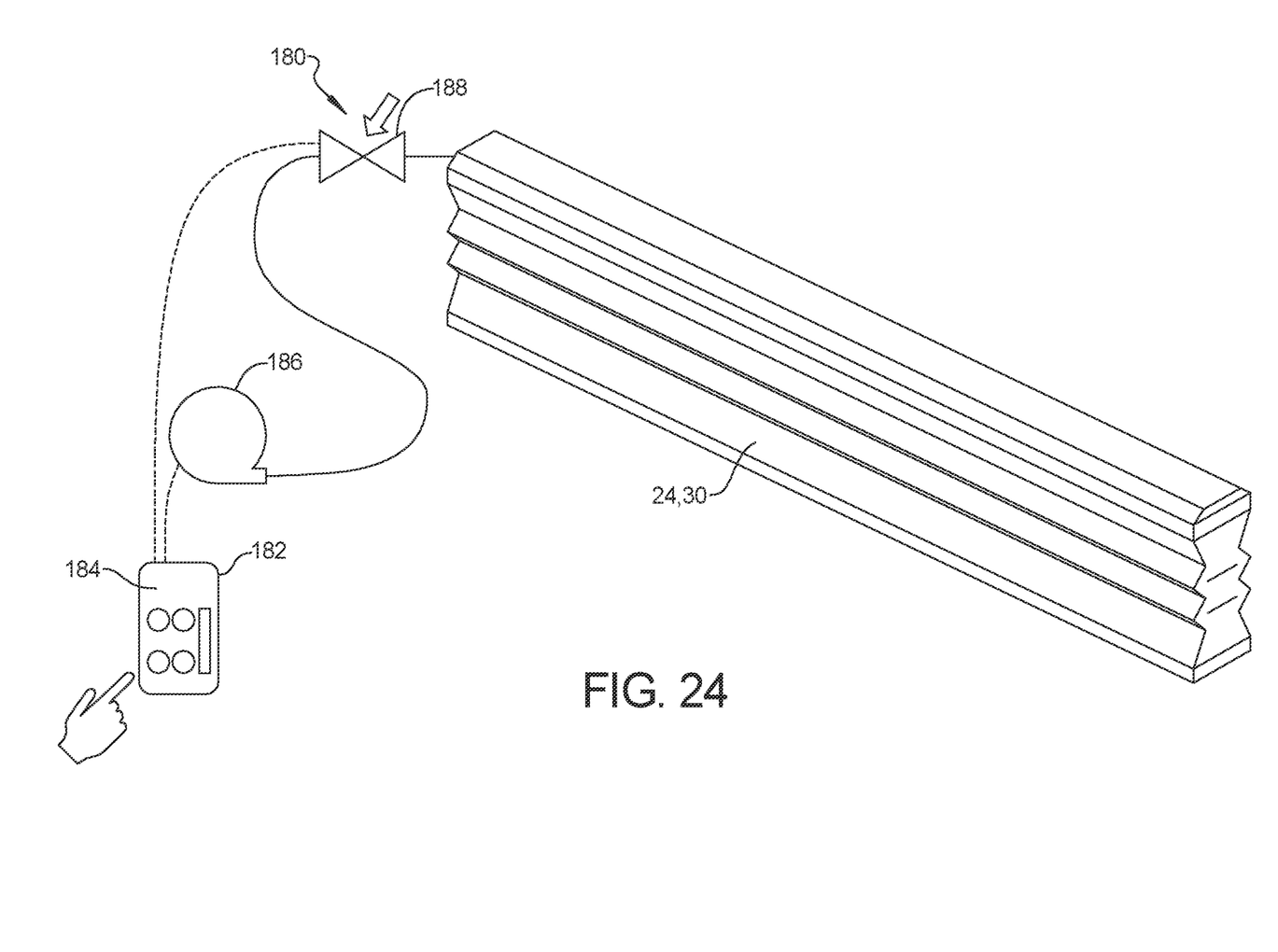
FIG. 24 is a schematic diagram of the second exemplary control system showing the motor deploying the side wall panel.
Figure 25:
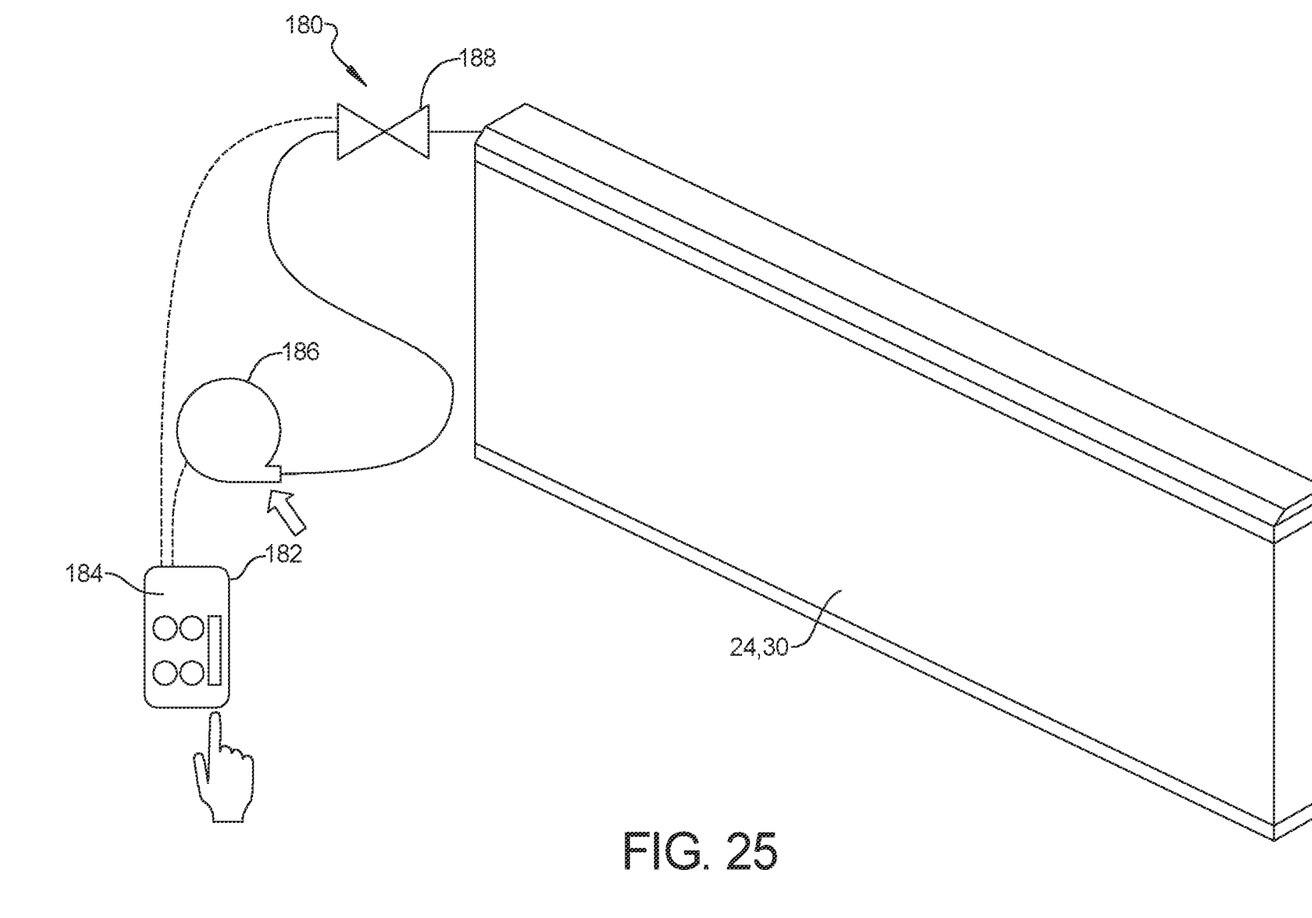
FIG. 25 is a schematic diagram of the second exemplary control system showing the pump inflating the side wall panel.

With reference to FIGS. 23-25, a second exemplary diagram is provided of the control system 180 for controlling the deployment and retraction of the bed side panels 24 and the end gate panels 30. As shown in FIG. 23, a controller 182 is provided in communication with a user interface 184 which can be activated to deploy or retract the bed side panels 24 and the end gate panels 30. The user interface 184 can include a wired or wireless interface that receives user inputs to "deploy" or "retract" the bed side panels 24 and the end gate panels 30. The "deploy" signals from the user interface can cause the controller 182 to provide signals to release a vacuum pressure from the panels 24, 30, as shown in FIG. 24 and to activate a compressor or pump 186 and an appropriate valve bank 188 to supply pressurized air to the bed side panels 24 and end gate panels 30, as shown in FIG. 25. The "retract" signal from the user interface 184 can cause the controller 182 to open the appropriate valve of a valve bank 188 to release the pressurized air within the bed side panels and the end gate panels and/or activate the pump 186 and valve bank 188 to apply a vacuum to the panels for quicker retraction. The controller 182 can also provide "lock" and "unlock" signals to the optional electromagnetic retention system 50, inflatable retention system 60 or another alternative controllable retention system. The controller 182, the pump 186 and the valve bank 188 can also be utilized to operate the pneumatic hinge joints 28 by applying pressurized air or vacuum to the extensor cavity 38 or the abductor cavity 40 as described herein.

The inflatable panels 24 of the present disclosure can be formed as an internally tensioned inflatable structure such as disclosed in commonly assigned U.S. Pat. No. 10,687,634 (issued Jun. 23, 2020) which is herein incorporated by reference in its entirety.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A pick-up truck cargo area, comprising:
    a cargo floor having a forward end, a rearward end and a pair of side edges extending between the forward end and the rearward end;
    a pair of bed side rails extending above and spaced from the cargo floor and defining an opening therebetween; and
    a pair of inflatable bedside panels being supported by one of the pair of bed side rails and the cargo floor and being inflatable to extend across the opening between the pair of bed side rails and the cargo floor.

2. The pick-up truck cargo area according to claim 1, wherein the pair of bed side rails support the pair of inflatable bedside panels.

3. The pick-up truck cargo area according to claim 2, wherein the pair of inflatable bedside panels are retractable into a hollow chamber of the pair of bed side rails.

4. The pick-up truck cargo area according to claim 2, further comprising a pair of end gate rails extending from ends of the pair of bed side rails.

5. The pick-tip truck cargo area according to claim 4, wherein an inflatable end gate panel is retractable into a hollow chamber of the pair of end gate rails.

6. The pick-up truck cargo area according to claim 4, wherein the pair of end gate rails are connected to the pair of bed side rails by a pneumatic hinge.

7. The pick-up truck cargo area according to claim 6, wherein the pneumatic hinge includes a hinge member having an extensor bladder and an abductor bladder.

8. The pick-up truck cargo area according to claim 7, wherein pressurized air supplied to the extensor bladder causes the hinge member to open and applying a vacuum pressure to the abductor bladder causes the hinge member to close.

9. The pick-up truck cargo area according to claim 1, further comprising an inflatable end gate panel extending along the rearward end of the cargo floor.

10. The pick-up truck cargo area according to claim 1, wherein the pair of inflatable bedside panels are reversibly attached to one of the cargo floor and the pair of bed side rails by at least one of a latch or a zipper.

11. The pick-up truck cargo area according to claim 1, wherein the pair of inflatable bedside panels are reversibly attached to one of the cargo floor and the pair of bed side rails by a magnetic element.

12. The pick-up truck cargo area according to claim 11, further comprising an electromagnetic element associated with the magnetic element that can be energized to release the inflatable bedside panels from the magnetic element.

13. The pick-up truck cargo area according to claim 1, wherein the pair of inflatable bedside panels are reversibly attached to one of the cargo floor and the pair of bed side rails by a secondary inflatable interface that extends from the inflatable bedside panels and is inflatable to extend into a recessed cavity.

14. The pick-up truck cargo area according to claim 1, further comprising an air pump connected to the pair of inflatable bedside panels.

15. The pick-up truck cargo area according to claim 1, further comprising a pair of rollers supporting the pair of inflatable bedside panels and each of the pair of rollers including a motor for rotating the pair of rollers to deploy and retract the inflatable bedside panels.

16. The pick-up truck cargo area according to claim 1, wherein the pair of inflatable bedside panels are received against at least one sidewall extending from the cargo floor and extending only partially across the opening.

17. The pick-up truck cargo area according to claim 1, further comprising a vacuum in communication with the pair of inflatable bedside panels.

18. A pick-up truck cargo area, comprising:
- a cargo floor having a forward end, a rearward end and a pair of side edges extending between the forward end and the rearward end;
- a pair of bed side rails extending above the cargo floor and defining an opening therebetween;
- a pair of inflatable bedside panels being inflatable so as to extend below the pair of bed side rails and across the opening to the cargo floor; and
- an air pump connected to the pair of inflatable bedside panels.

19. The pick-up truck cargo area according to claim 18, further comprising a vacuum connected to the pair of inflatable bedside panels.

20. A pick-up truck cargo area, comprising:
- a cargo floor having a forward end, a rearward end and a pair of side edges extending between the forward end and the rearward end;
- a pair of bed side rails extending above the cargo floor;
- a pair of inflatable bedside panels attached to one of the cargo floor and the pair of bed side rails extending above the cargo floor;
- a pair of end gate rails extending from ends of the pair of bed side rails;
- a pair of inflatable end gate panels are retractable into a hollow chamber of the pair of end gate rails;
- wherein the pair of end gate rails are connected to the pair of bed side rails by a pneumatic hinge; and
- an air pump connected to the pair of inflatable bedside panels and the pair of inflatable end gate panels.

* * * * *